(12) United States Patent
Hsiao et al.

(10) Patent No.: US 10,377,262 B2
(45) Date of Patent: *Aug. 13, 2019

(54) RANGE EXTENDING APPARATUS FOR ELECTRIC VEHICLE AND CONTROL METHOD THEREOF

(71) Applicant: NATIONAL CHUNG SHAN INSTITUTE OF SCIENCE AND TECHNOLOGY, Taoyuan (TW)

(72) Inventors: Wei-Min Hsiao, Taoyuan (TW); Kuo-Kuang Jen, Taoyuan (TW); Jeng-Chyan Lin, Taichung (TW); Hsun-Ming Hsien, Taoyuan (TW); Fu-Min Fang, Taoyuan (TW)

(73) Assignee: NATIONAL CHUNG SHAN INSTITUTE OF SCIENCE AND TECHNOLOGY, Taoyuan (TW)

(*) Notice: Subject to any disclaimer, the term of this patent is extended or adjusted under 35 U.S.C. 154(b) by 419 days.

This patent is subject to a terminal disclaimer.

(21) Appl. No.: 15/370,889

(22) Filed: Dec. 6, 2016

(65) Prior Publication Data

US 2018/0154794 A1    Jun. 7, 2018

(51) Int. Cl.
*B60L 58/22* (2019.01)
*B60L 11/18* (2006.01)
(Continued)

(52) U.S. Cl.
CPC ............ *B60L 11/1866* (2013.01); *B60L 7/16* (2013.01); *B60L 8/003* (2013.01); *B60L 50/50* (2019.02);
(Continued)

(58) Field of Classification Search
CPC .......... B60L 58/22; B60L 58/14; B60L 50/50; B60L 7/16; B60L 8/003; B60L 2240/547; H02J 7/0016; Y02T 10/7055
See application file for complete search history.

(56) References Cited

U.S. PATENT DOCUMENTS

| | | | | |
|---|---|---|---|---|
| 6,114,835 A | * | 9/2000 | Price | H02J 7/0018 |
| | | | | 320/118 |
| 6,275,004 B1 | * | 8/2001 | Tamai | B60K 6/28 |
| | | | | 320/118 |

(Continued)

OTHER PUBLICATIONS

Merriam-Webster, "the definition of accumulator." pp. 1-2.*

*Primary Examiner* — Pinping Sun
(74) *Attorney, Agent, or Firm* — WPAT, PC (57) ABSTRACT

Electric vehicle range extending apparatus includes a step-down voltage provision unit, cell voltage sensing unit, cell switching unit, and control unit. The step-down voltage provision unit has an input port to be coupled to the main battery pack or an auxiliary battery pack, and an output port to output a power balancing signal. The cell voltage sensing unit is for being coupled to the battery cells and sensing individual voltages of the battery cells. The cell switching unit, including a plurality of switches, is coupled to the battery cells respectively, and coupled to the output port. The control unit, coupled to the cell voltage sensing unit, step-down voltage provision unit, and cell switching unit, is for controlling the cell switching unit based on the individual voltages of the battery cells so as to apply the power balancing signal to at least one of the battery cells selectively.

11 Claims, 6 Drawing Sheets

(51) Int. Cl.
*B60L 8/00* (2006.01)
*H02J 7/00* (2006.01)
*B60L 7/16* (2006.01)
*B60L 50/50* (2019.01)
*B60L 58/14* (2019.01)

(52) U.S. Cl.
CPC .............. *B60L 58/14* (2019.02); *B60L 58/22* (2019.02); *H02J 7/0016* (2013.01); *B60L 2240/547* (2013.01); *Y02T 10/7055* (2013.01)

(56) References Cited

U.S. PATENT DOCUMENTS

| | | | | |
|---|---|---|---|---|
| 7,193,392 | B2 * | 3/2007 | King | B60L 58/22 320/118 |
| 7,675,261 | B2 * | 3/2010 | Elder | B60L 3/0046 307/10.7 |
| 7,830,117 | B2 * | 11/2010 | Ambrosio | B60L 3/0046 320/109 |
| 7,872,443 | B2 * | 1/2011 | Ward | H02J 7/35 320/103 |
| 8,164,305 | B2 * | 4/2012 | Zhang | H01M 10/42 320/118 |
| 8,294,421 | B2 * | 10/2012 | Bucur | H02J 7/0019 320/116 |
| 8,330,418 | B2 * | 12/2012 | Furukawa | H02J 7/0018 320/118 |
| 8,350,528 | B2 * | 1/2013 | Yang | H02J 7/0016 320/103 |
| 8,497,661 | B2 * | 7/2013 | Murao | H02J 7/0016 320/118 |
| 8,547,065 | B2 * | 10/2013 | Trigiani | H02J 7/0018 320/119 |
| 8,957,625 | B2 * | 2/2015 | Li | H01M 10/42 320/103 |
| 9,172,256 | B2 * | 10/2015 | Tsai | H02J 7/0042 |
| 9,450,426 | B2 * | 9/2016 | Moorhead | H02J 7/0016 |
| 2004/0257042 | A1 * | 12/2004 | Liu | H01M 10/441 320/130 |
| 2005/0045392 | A1 * | 3/2005 | Maslov | B60L 8/00 180/65.51 |
| 2008/0211459 | A1 * | 9/2008 | Choi | B60L 3/0046 320/134 |
| 2009/0027006 | A1 * | 1/2009 | Vezzini | H02J 7/0014 320/118 |
| 2011/0025126 | A1 * | 2/2011 | Brabec | B60L 11/1809 307/9.1 |
| 2011/0156620 | A1 * | 6/2011 | Yeh | H02J 7/1423 318/139 |
| 2012/0139491 | A1 * | 6/2012 | Eberhard | H02J 7/0016 320/118 |
| 2013/0002203 | A1 * | 1/2013 | Kuraishi | H02J 7/0018 320/134 |
| 2013/0049673 | A1 * | 2/2013 | Agarwal | H02J 7/0016 320/101 |
| 2013/0106357 | A1 * | 5/2013 | Girard | H01M 10/441 320/126 |
| 2013/0106360 | A1 * | 5/2013 | Gaylo | H02J 7/0013 320/134 |
| 2013/0306389 | A1 * | 11/2013 | Penev | B60L 8/003 180/165 |
| 2014/0002021 | A1 * | 1/2014 | Bertness | B60L 58/26 320/109 |
| 2015/0244190 | A1 * | 8/2015 | Yamamoto | H02J 7/0016 320/126 |
| 2016/0094063 | A1 * | 3/2016 | Wu | H02J 7/0019 320/112 |
| 2016/0172875 | A1 * | 6/2016 | Lee | H02J 7/0014 320/118 |
| 2016/0190825 | A1 * | 6/2016 | Lih | H02J 7/04 320/152 |
| 2017/0008419 | A1 * | 1/2017 | Kim | B60L 58/12 |
| 2018/0145520 | A1 * | 5/2018 | Sasaki | H01M 10/48 |

* cited by examiner

RANGE EXTENDING APPARATUS FOR ELECTRIC VEHICLE AND CONTROL METHOD THEREOF

FIELD OF THE INVENTION

The present invention relates generally to a range extending apparatus and method, and more generally to an electric vehicle range extending apparatus and control method thereof.

BACKGROUND OF THE INVENTION

Regarding the current electric vehicles, the most concerns and critical problems are the battery cost and battery life issues. Hence, the main target of the research and development is to improve battery life and to reduce battery cost. In terms of cost-performance ratio, the extension of the battery life may be a possible solution. The battery cells of a battery pack of an electric vehicle, whose battery life are generally about 5 to 10 years, cannot be utilized in producing high power to the electric vehicle when the battery cells have been used over the battery life due to becoming weak in their functionality and reliability. Although the used battery is not useless, the cells of the battery pack suffer from the problems of discrepancy in capacity, internal resistance, self-discharge rate, and energy conversion efficiency. In a case of supplying large current and having large power load, the discrepancy of the battery cells causes the entire battery pack's failure to provide the power required by the load.

In addition, lithium-ion batteries, among other types of battery employed in electric vehicles in general, has the advantages of high energy and power density. However, a battery management system is required to balance the voltages among the battery cells since the lithium-ion battery cells in series suffer from the discrepancy among the battery cells. When the cell with the lowest voltage (or the weakest cell) reaches an over-discharge voltage, the battery management system is to cut off the load (e.g., the motor of the electric vehicle) for protection, and the cut-off protection will cause the reduction in the effective cruising performance of the electric vehicle. However, if the system does not protect the weakest cell immediately and make the weakest cell avoid the problem of over-discharge, the battery life of the entire battery pack will be reduced.

In addition, it should be noted that the battery pack with large capacity and a large number of cells in series and/or in parallel differs from the application of the battery in consuming portable products. However, there is no perfect reliable battery management system available in the market, particularly directed to balance strategy among modules, with respect to the application of the battery pack with high voltage and a large number of cells in series. The above phenomenon will not cause too much impact on low-voltage or consumer electronic products. However, the impact of this phenomenon and their derivable problems on the large-scale battery applications, such as energy storage systems, electric buses, and so on, will be serious and cannot be ignored.

Thus, it is desirable to improve the battery management technology for the electric vehicle, so as to utilize the battery of the electric vehicle effectively.

SUMMARY OF THE INVENTION

An object of the invention is to provide an electric vehicle range extending apparatus, based on which battery management can be implemented, for instance, to apply a power balancing signal to a battery cell with a lowest voltage in a battery pack, thus mitigating over-discharging of the battery cell with the lowest voltage, and balancing the battery pack.

According to the above object, the invention provides an electric vehicle range extending apparatus, for use in an electric vehicle, the electric vehicle having a main battery pack including a plurality of battery cells, the apparatus comprising: a step-down voltage provision unit, a cell voltage sensing unit, a cell switching unit, and a control unit. The step-down voltage provision unit has: an input port to be coupled to the main battery pack or an auxiliary battery pack, and an output port to output a power balancing signal. The cell voltage sensing unit is for being coupled to the battery cells and sensing individual voltages of the battery cells. The cell switching unit, including a plurality of switches, is coupled to the battery cells respectively, and coupled to the output port. The control unit, coupled to the cell voltage sensing unit, the step-down voltage provision unit, and the cell switching unit, is for controlling the cell switching unit based on the individual voltages of the battery cells so as to apply the power balancing signal to at least one of the battery cells selectively.

In an embodiment of the invention, the control unit is for determining a battery cell with a lowest voltage among the battery cells, based on the individual voltages of the battery cells, and accordingly controlling the cell switching unit to apply the power balancing signal selectively to the battery cell with the lowest voltage.

In an embodiment of the invention, the control unit enables the input port to be coupled to the main battery pack or the auxiliary battery pack selectively based on whether the auxiliary battery pack has sufficient electricity, so that the step-down voltage provision unit outputs the power balancing signal from the output port.

In an embodiment of the invention, the auxiliary battery pack is coupled to a renewable electricity generation system and obtains energy therefrom.

In an embodiment of the invention, the renewable electricity generation system is a solar electricity generation system.

In an embodiment of the invention, the auxiliary battery pack is coupled to a regenerative braking system and obtains energy therefrom.

In an embodiment of the invention, the regenerative braking system is an in-wheel generator of the electric vehicle.

According to the above object, the invention also provides an electric vehicle range extending method, comprising: a) providing an electric vehicle range extending apparatus in an electric vehicle, wherein the electric vehicle has a main battery pack including a plurality of battery cells, the apparatus comprising a cell voltage sensing unit, a step-down voltage provision unit, a cell switching unit, and a control unit, the step-down voltage provision unit, coupled to the main battery pack or an auxiliary battery pack, is for outputting a power balancing signal; b) sensing individual voltages of the battery cells by using the cell voltage sensing unit; c) controlling the cell switching unit by the control unit based on the individual voltages of the battery cells, so as to apply the power balancing signal to at least one of the battery cells selectively.

In an embodiment of the invention, the step c) comprises: determining, by the control unit, a battery cell with a lowest voltage among the battery cells, based on the individual voltages of the battery cells, and accordingly controlling the cell switching unit so as to apply the power balancing signal selectively to the battery cell with the lowest voltage.

In an embodiment of the invention, the step c) comprises: determining, among the battery cells, a first battery cell with a highest voltage and a second battery cell with a lowest voltage, based on the individual voltages of the battery cells; determining whether a voltage difference between the first battery cell and the second battery cell is greater than a balance setting value; determining whether a voltage of the second battery cell lies between a balance starting value and a low-voltage setting value if the voltage difference is greater than the balance setting value; controlling the cell switching unit so as to apply the power balancing signal selectively to the second battery cell if the voltage of the second battery cell lies between the balance starting value and the low-voltage setting value.

In an embodiment of the invention, the method further comprises: determining whether a voltage difference between the second battery cell and a battery cell having a lowest voltage among the main battery pack except the second battery cell is greater than a balance cut-off value; if so, stopping to apply the power balancing signal to the second battery cell.

In an embodiment of the invention, the method further comprises: enabling the step-down voltage provision unit to be coupled to the main battery pack or the auxiliary battery pack selectively, by using the control unit based on whether the auxiliary battery pack has sufficient electricity, so that the step-down voltage provision unit outputs the power balancing signal from the output port.

In an embodiment of the invention, the method further comprises: if the auxiliary battery pack has sufficient electricity, enabling the step-down voltage provision unit to be coupled to the auxiliary battery pack, so that the step-down voltage provision unit outputs the power balancing signal; if the auxiliary battery pack has not sufficient electricity, enabling the step-down voltage provision unit to be coupled to the main battery pack, so that the step-down voltage provision unit outputs the power balancing signal.

For better understanding of the above and other aspects of the invention, a plurality of embodiments or examples will be taken with accompanying drawings to provide detailed description as follows.

DETAILED DESCRIPTION OF THE PREFERRED EMBODIMENTS

To make it easier for the examiner to understand the objects, characteristics and effects of this invention, we use a preferred embodiment together with the attached drawings for the detailed description of the invention.

Figure 1:
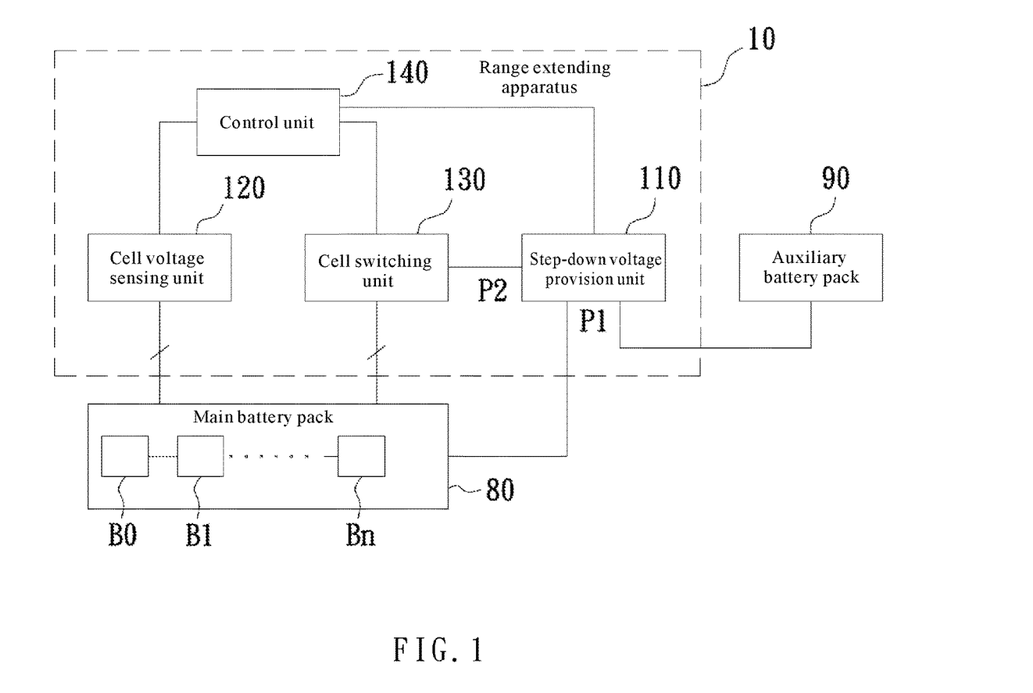
FIG. 1 is a block diagram illustrating an electric vehicle range extending apparatus according to an embodiment of the invention.

FIG. 1 is a block diagram illustrating an electric vehicle range extending apparatus 10 according to an embodiment of the invention. The electric vehicle range extending apparatus 10 can be used in an electric vehicle utilizing a main battery pack 80 including a plurality of battery cells (B0, B1, . . . , Bn) in series, for example.

As shown in FIG. 1, the electric vehicle range extending apparatus 10 includes a step-down voltage provision unit 110, a cell voltage sensing unit 120, a cell switching unit 130, and a control unit 140. The step-down voltage provision unit 110 has an input port P1 and an output port P2, wherein the input port P1 is for being coupled to the main battery pack 80 or an auxiliary battery pack 90, and the output port P2 is for outputting a power balancing signal, such as a current or voltage signal. The cell voltage sensing unit 120 is for being coupled to the battery cells and sensing individual voltages of the battery cells. The cell switching unit 130 includes a plurality of switches, coupled to the battery cells respectively, and coupled to the output port P2. The control unit 140 is coupled to the cell voltage sensing unit 120, the step-down voltage provision unit 110, and the cell switching unit 130. The control unit 140 is for controlling the cell switching unit 130, so that the power balancing signal outputted from the output port P2 can be provided to at least one of the battery cells selectively.

Battery management can be implemented based on the structure of the electric vehicle range extending apparatus 10 as shown in FIG. 1. For example, applying a power balancing signal to a battery cell with a lowest voltage among a battery pack can mitigate over-discharging of the battery cell with the lowest voltage, so as to balance the battery pack. Embodiments of a control method for battery management will be exemplified later.

For example, in an embodiment, the control unit 140 is used for determining a battery cell with a lowest voltage among the battery cells, based on individual voltages of the battery cells, and accordingly controlling the cell switching unit 130, so that a power balancing signal from the output port P2 can be applied selectively to the battery cell with the lowest voltage.

In another embodiment, the control unit 140 can further used for enabling the input port P1 to be coupled to the main battery pack 80 or the auxiliary battery pack 90 selectively, based on whether the auxiliary battery pack 90 has sufficient electricity (or remaining capacity), so that the step-down voltage provision unit 110 outputs the power balancing signal from the output port P2. In addition, the auxiliary battery pack 90 can be coupled to and obtain energy from a renewable electricity generation system. For instance, the renewable electricity generation system is a solar electricity generation system. In addition, the auxiliary battery pack 90 can be coupled to and obtain energy from a regenerative braking system. For instance, the regenerative braking system is an in-wheel generator of the electric vehicle.

The implementation of the step-down voltage provision unit 110, cell voltage sensing unit 120, cell switching unit 130, and control unit 140 in FIG. 1 will be exemplified in the following.

Figure 2:
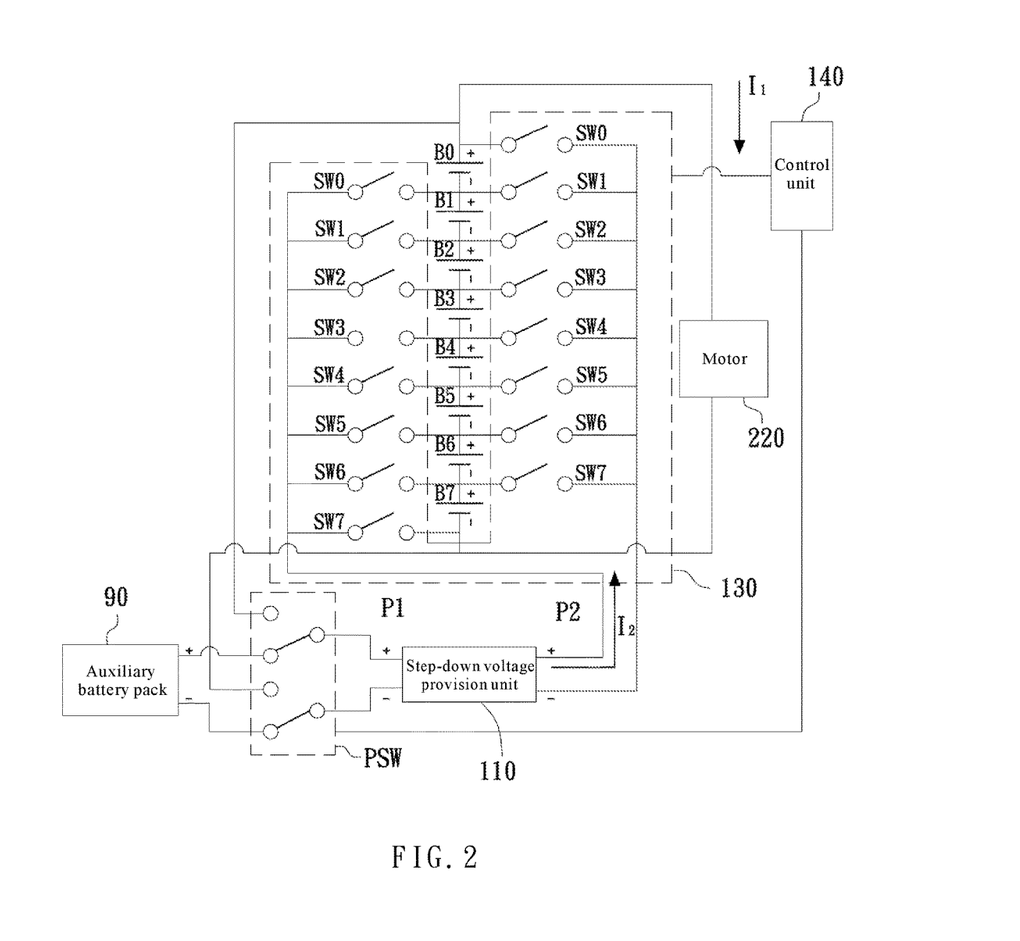
FIG. 2 is a circuit diagram illustrating an electric vehicle range extending apparatus according to an embodiment of the invention.

FIG. 2 illustrates an electric vehicle range extending apparatus 10 according to an embodiment of the invention in a circuit diagram. For example, as shown in FIG. 2, the step-down voltage provision unit 110 has an input port P1 and an output port P2. The input port P1 is for being coupled to the main battery pack 80 or an auxiliary battery pack 90; the output port P2 is for outputting a power balancing signal.

For instance, the input port P1 is coupled to the main battery pack 80 and the auxiliary battery pack 90 by using a power switching device PSW, and the control unit 140 can be configured to output a control signal, which can enable the power switching device PSW to select the main battery pack 80 or auxiliary battery pack 90 for connection to the input port P1.

For example, the step-down voltage provision unit 110 can be implemented by using electronic components including a power converter, such as a flyback converter. In addition, the step-down voltage provision unit 110 can be implemented by using other power converter such as a switching converter or linear transformer. In the implementation of the step-down voltage provision unit 110 by using a power converter, the input port P1 is coupled to a first winding of the power converter, and the output port P2 is coupled to the second winding of the power converter, so as to output a power balancing signal, such as current or voltage signal.

As shown in FIG. 2, the cell switching unit 130 includes a plurality of switches (SW0-SW7), the switches are coupled to the battery cells respectively, and coupled to the output port P2 of the step-down voltage provision unit 110. For instance, in FIG. 2, two switches SW0 are connected to two terminals of the battery cell B0, and connected to the output port P2. Another two switches SW1 are connected to two terminals of the battery cell B1, and connected to the output port P2. Similarly, the other battery cells B2-B7 can be coupled to the output port P2 through two switches. The above switches can be implemented by using optical relays or other switching elements.

The control unit 140 can be used for controlling the cell switching unit 130 so that the power balancing signal from the output port P2 can be applied to at least one of the battery cells. For example, the control unit 140 can send a control signal to the two switches SW0 to turn on the two switches SW0, and send other control signals to other switches SW1~SW7 to turn off the other switches SW1~SW7, so that the power balancing signal from the output port P2 can be applied to the battery cell B0. Certainly, the invention is not limited to these examples. In some embodiments, the control unit 140 can be implemented to control turning on of multiple pairs of the switches so that one or more power balancing signals can be applied to any two or more battery cells.

The control unit 140 may be implemented by a processor, a digital signal processor, or a programmable integrated circuit such as a microcontroller and a field programmable gate array (FPGA) or an application specific integrated circuit (ASIC), or by a dedicated circuit or module.

In addition, in the embodiment of FIG. 2, the input port P1 can be used for being coupled to the main battery pack 80 or the auxiliary battery pack 90 selectively. However, the invention is not limited thereto; in another embodiment, the input port P1 of the step-down voltage provision unit 110 can be coupled to the main battery pack 80 directly, so as to utilize the main battery pack 80 only to generate a power balancing signal. In yet another embodiment, the input port P1 of the step-down voltage provision unit 110 can be coupled to the auxiliary battery pack 90 directly, so as to utilize the auxiliary battery pack 90 only to generate a power balancing signal.

Figure 3:
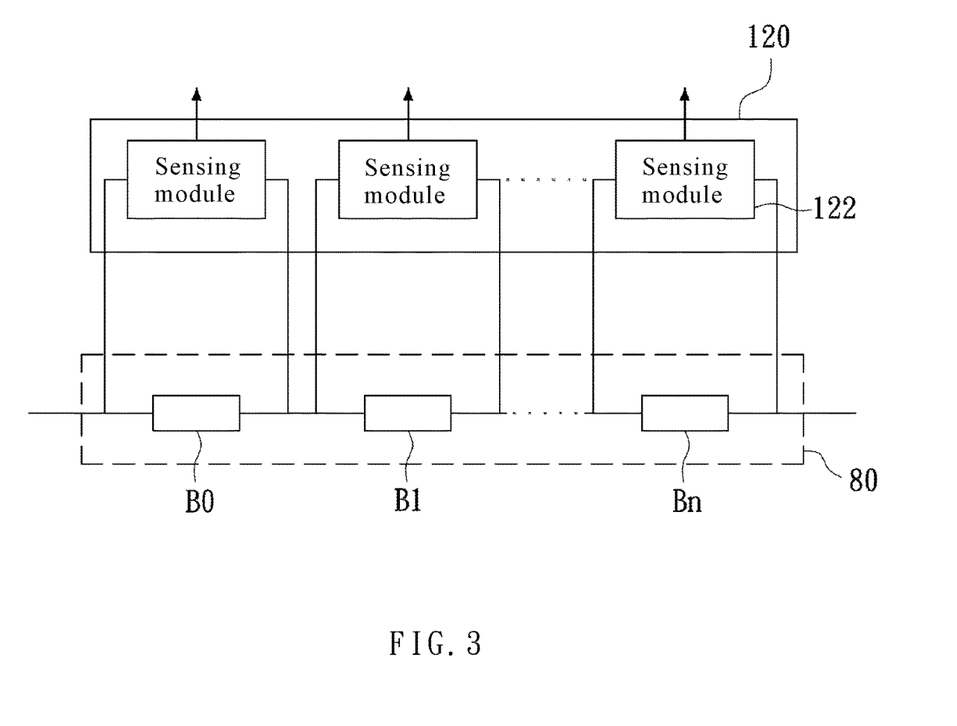
FIG. 3 is a block diagram illustrating an embodiment of a cell voltage sensing unit.

FIG. 3 illustrates an embodiment of the cell voltage sensing unit 120 in a block diagram. As shown in FIG. 3, the cell voltage sensing unit 120 includes a plurality of sensing module 122, each of which is coupled to a corresponding battery cell. The sensing module 122 is used for sensing a voltage of the corresponding battery cell. For example, the sensing modules 122 can be implemented as any one of the following circuits: a differential resistance measurement circuit, differential amplifier measurement circuit, analog multiplexer with differential amplifier measurement circuit, optical relay with differential amplifier measurement circuit, optical relay measurement circuit, multiplexer with optical relay measurement circuit. It will be apparent that the invention is not limited to the embodiments; in some embodiments, the cell voltage sensing unit 120 can be implemented as any combination of any two or more of the above measuring circuits as exemplified. In addition, any circuit that is capable of measuring the battery cell can be employed to implement the cell voltage sensing unit 120.

Hence, for example, the control unit 140 can determine a battery cell with a lowest voltage among the battery cells (for instance battery cell B3) based on individual voltages of the battery cells, and accordingly can control the cell switching unit 130 so that a power balancing signal from the output port P2 can be applied selectively to the battery cell with the lowest voltage (for instance battery cell B3). For example, the control unit 140 determines that the battery cell B3 is the battery cell with the lowest voltage among the battery cells, based on the individual voltages of the battery cells; the control unit 140 can output a control signal to the cell switching unit 130 to turn on the two corresponding switches, i.e., SW3, of the battery cell with the lowest voltage, and turn off the other switches, so that the power balancing signal is applied to the battery cell with the lowest voltage.

In addition, in an embodiment, the apparatus can further include a power sensing unit, for sensing electricity stored in the auxiliary battery pack 90. Thus, the control unit 140 can be used for enabling the input port P1 to be coupled to the main battery pack 80 or the auxiliary battery pack 90 selectively, based on whether the auxiliary battery pack 90 has sufficient electricity, so that the step-down voltage provision unit 110 outputs the power balancing signal from the output port P2. The power sensing unit can be implemented by using the example as taken for the sensing module, or any circuit for sensing amount of electricity. For example, the power sensing unit may detect the voltage or current from the auxiliary battery pack 90, and check whether the voltage or current detected exceeds a threshold.

Embodiments of a control method for the electric vehicle range extending apparatus 10 will be provided below.

Figure 4:
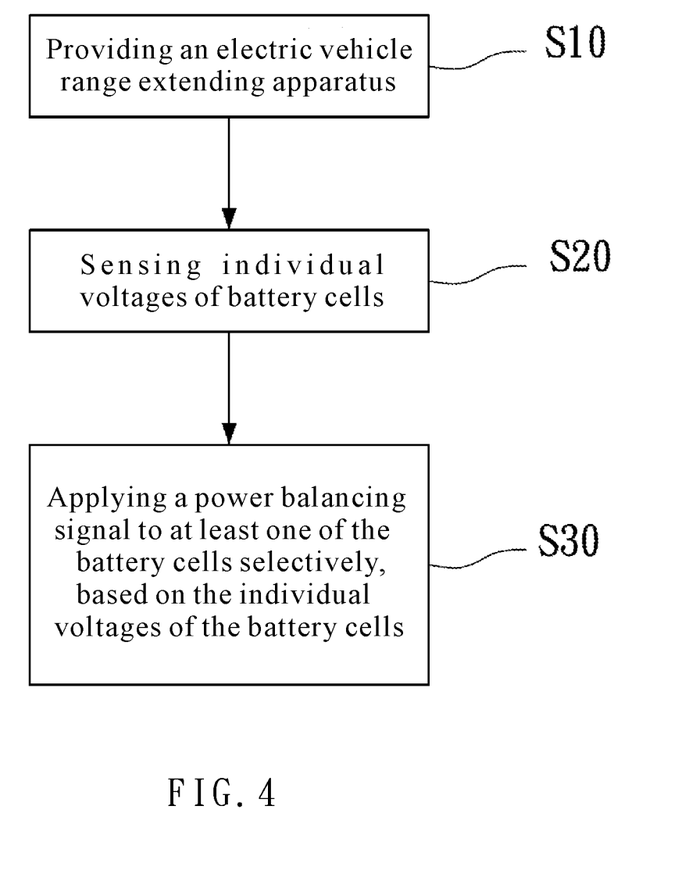
FIG. 4 is a flowchart illustrating a control method of an electric vehicle range extending apparatus according to another embodiment of the invention.

FIG. 4 illustrates a control method for the electric vehicle range extending apparatus 10 according to an embodiment of the invention in a flowchart. As shown in FIG. 4, the method includes the following steps.

As shown in step S10, an electric vehicle range extending apparatus 10 is provided in an electric vehicle, which has a main battery pack 80 including a plurality of battery cells. The electric vehicle range extending apparatus 10 includes a cell voltage sensing unit 120, a step-down voltage provision unit 110, a cell switching unit 130, and a control unit 140. The step-down voltage provision unit 110 is for being coupled to the main battery pack 80 or an auxiliary battery pack 90, so as to output a power balancing signal. As shown in step S20, individual voltages of the battery cells are sensed by the cell voltage sensing unit 120. As shown in step S30, the cell switching unit 130 is controlled by the control unit 140 based on the individual voltages of the battery cells, so as to apply the power balancing signal from the step-down voltage provision unit 110 to at least one of the battery cells selectively.

Figure 5:
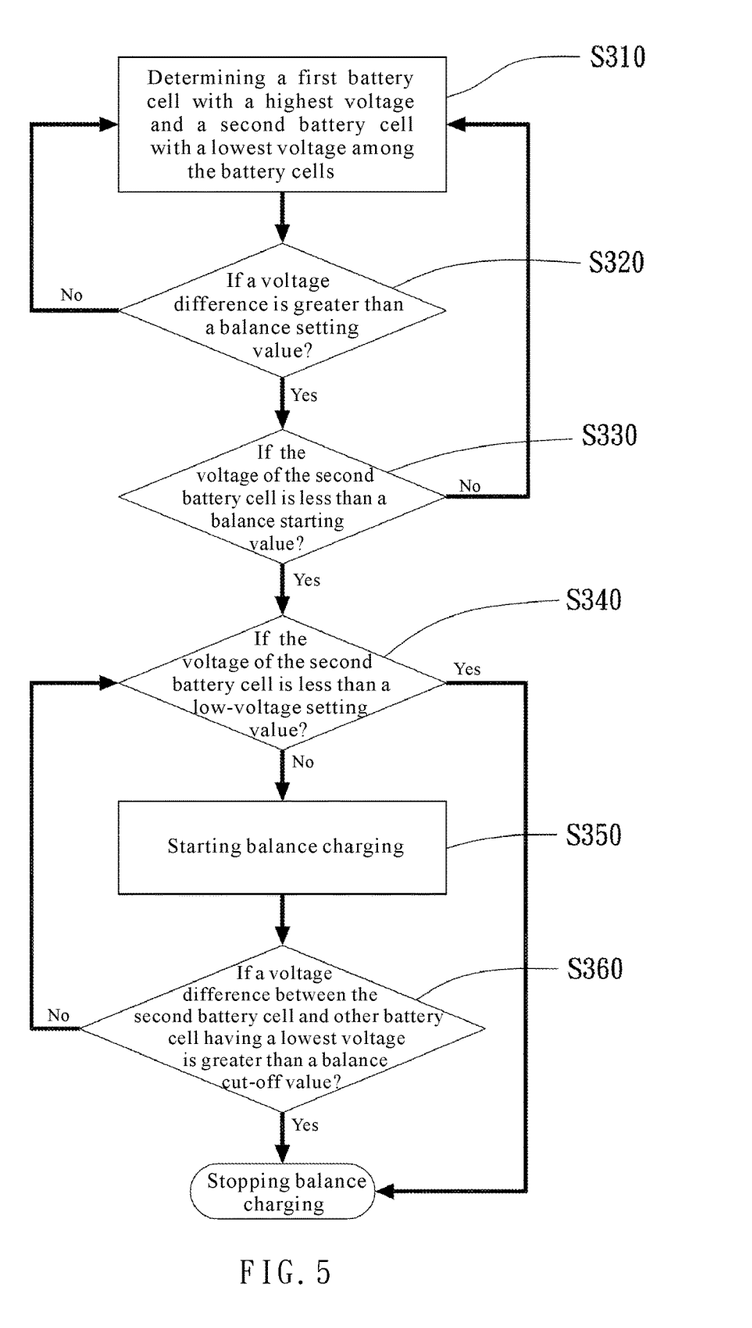
FIG. 5 is a flowchart illustrating an embodiment of step S30 in FIG. 4.

For example, the above step S30 may be implemented as: determining a battery cell with a lowest voltage among the battery cells by using the control unit 140 based on individual voltages of the battery cells, and accordingly controlling the cell switching unit 130 so as to apply the power balancing signal from the step-down voltage provision unit 110 selectively to the battery cell with the lowest voltage. The implementation of the step S30 will be described further by the following embodiments. Referring to FIG. 5, an embodiment of the step S30 of the method control in FIG. 4 for the electric vehicle range extending apparatus 10 is illustrated in flowchart form.

As shown in FIG. 5, in step S310, among the battery cells, a battery cell with a highest voltage (hereinafter, a first battery cell) and a battery cell with a lowest voltage (hereinafter, a second battery cell) are determined based on the individual voltages of the battery cells.

In step S320, it is determined whether a voltage difference between the first battery cell and the second battery cell is greater than a balance setting value. If the voltage difference is greater than the balance setting value, step S330 is performed. If not, step S310 (for instance, performed using the updated measurements of the battery cells' voltages) can be performed again, or other step can be performed; and it is understood that the invention is not limited thereto.

In step S330, it is determined whether the voltage of the second battery cell is less than the balance starting value. If the voltage of the second battery cell is less than the balance starting value, step S340 is performed. If not, step S310 (for instance, performed using the updated measurements of the battery cells' voltages) can be performed again, or other step can be performed; and it is understood that the invention is not limited thereto.

In step S340, it is determined whether the voltage of the second battery cell is less than a low-voltage setting value. If the voltage of the second battery cell is not less than the low-voltage setting value, i.e., the voltage of the second battery cell lies between the balance starting value and the low-voltage setting value, then step S350 is executed to perform balance charging with respect to the second battery cell. If the voltage of the second battery cell is less than the low-voltage setting value, it indicates that the balance charging is not necessary currently. Thus, step S310 (for instance, performed using the updated measurements of the battery cells' voltages) can be performed again, or other step can be performed; and it is understood that the invention is not limited thereto.

In step S350, the cell switching unit 130 is controlled so that the power balancing signal from the step-down voltage provision unit 110 is applied to the second battery cell selectively, thus performing balance charging with respect to the second battery cell.

An embodiment of step S30 of the control method of FIG. 4 for the electric vehicle range extending apparatus 10, may include the steps S310-S350, by which the electric vehicle range extending apparatus 10 is controlled so as to start performing balance charging with respect to the second battery cell (the battery cell with the lowest voltage).

In addition, in another embodiment, the control method of FIG. 4 for the electric vehicle range extending apparatus 10 may further includes step S360, by which the electric vehicle range extending apparatus 10 is controlled so as to start performing balance charging with respect to the second battery cell (the battery cell with the lowest voltage), and to further control whether to continue or stop performing balance charging with respect to the second battery cell, thus efficiently utilizing energy in the electric vehicle. In step S360, it is determined whether a voltage difference between the second battery cell and a battery cell having a lowest voltage among the main battery pack except the second battery cell (i.e., the one which has the lowest voltage, other than the second battery cell) is greater than a balance cut-off value. If so, it is stopped applying the power balancing signal to the second battery cell. If not, step S350 is continued. In other words, the balance charging with respect to the second battery cell performs until the voltage difference between the second battery cell and a battery cell having the lowest voltage among the main battery pack except the second battery cell (i.e., the one which has the lowest voltage, other than the second battery cell) is greater than the balance cut-off value.

The principle of the above control method is illustrated. Referring back to FIG. 2, initially, each of the battery cells in series in the battery pack has a discharging current I1, and then balance charging is performed with respect to a battery cell, in which a current I2 is flown due to the power balancing signal, so that the discharging current of the battery cell being balanced is reduced to I1-I2. Since the battery cell being balanced has a discharging current less than that of other battery cell, the voltage of the battery cell being balanced will decrease in a rate lower than the rate before the balance charging is performed. When the voltage of the battery cell being balanced satisfies a setting value, the balance charging can be stopped and the control method can determine whether to continue balance charging or not, thus mitigating the over-discharging of the battery cells.

In addition, the implementation of the control method of the electric vehicle range extending apparatus 10 according to FIG. 4 is not limited to the above examples; in other embodiments, the balance charging can be determined to be continued or stopped in a preset or an evaluated time period, or controlled by other criterion.

In addition, in another embodiment of the control method of the electric vehicle range extending apparatus 10 according to FIG. 4, after the balance charging with respect to a specific battery cell is ended, individual voltages of the battery cells can be monitored according to step S20, and balance charging can be performed with respect to any of the battery cells (which may be the same battery cell or other), according to an embodiment of step S30.

In addition, another embodiment of the control method of the electric vehicle range extending apparatus 10 according to FIG. 4, further includes: the step-down voltage provision unit 110 is enabled to be coupled to the main battery pack 80 or the auxiliary battery pack 90 selectively by using the control unit 140 based on whether the auxiliary battery pack 90 has sufficient electricity, so that the step-down voltage provision unit 110 outputs the power balancing signal from the output port P2. If the auxiliary battery pack 90 has sufficient electricity, the step-down voltage provision unit 110 is enabled to be coupled to the auxiliary battery pack 90, so that the step-down voltage provision unit 110 outputs the power balancing signal. If the auxiliary battery pack 90 has not sufficient electricity, the step-down voltage provision unit 110 is enabled to be coupled to the main battery pack 80, so that the step-down voltage provision unit 110 outputs the power balancing signal.

Figure 6:
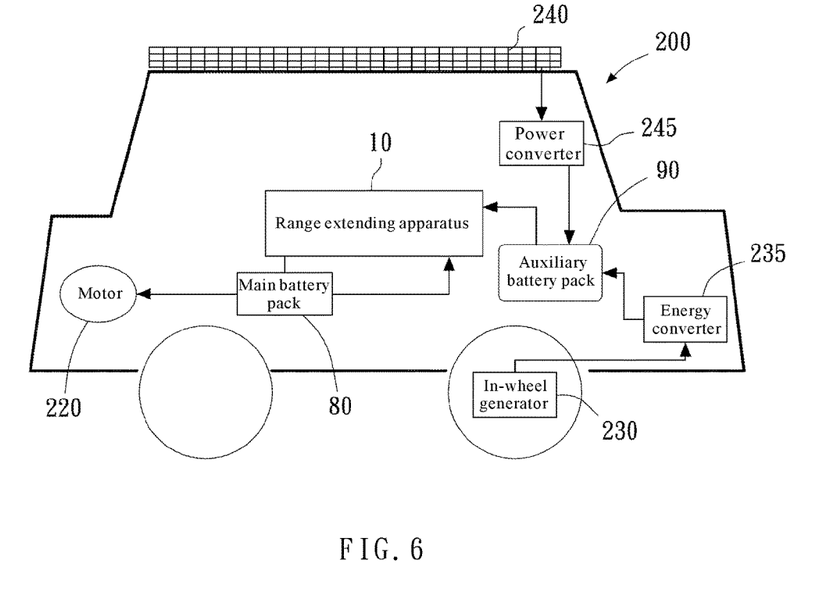
FIG. 6 is a block diagram illustrating an application of an electric vehicle range extending apparatus according to an embodiment of the invention in an electric vehicle.

FIG. 6 illustrates an application of an electric vehicle range extending apparatus according to an embodiment of the invention in an electric vehicle in a block diagram. As shown in FIG. 6, an electric vehicle 200 is installed with an electric vehicle range extending apparatus 10 according to any embodiment of FIGS. 1-4, which can utilize the main battery pack 80 or auxiliary battery pack 90 as an energy source to provide a power balancing signal. The main battery pack 80 is used for being coupled to a motor 70 of the electric vehicle 200 for driving the wheels. In addition, as shown in FIG. 6, the auxiliary battery pack 90 may obtain energy from two energy sources, for instance, a renewable electricity generation system such as a solar electricity generation system, and a regenerative braking system such as an in-wheel generator of the electric vehicle 200. For example, the electric vehicle 200 includes an in-wheel generator 230, an energy converter 235, a solar plate 240, a power converter 245. The auxiliary battery pack 90 can be coupled to and obtains energy from the solar electricity generation system including the solar plate 240 and power converter 245. In addition, the auxiliary battery pack 90 can be coupled to and obtains energy from the regenerative braking system including the in-wheel generator 230 and energy converter 235.

In the following a specific example, implementation of the electric vehicle range extending apparatus and the control method according to the invention in an electric vehicle and its advantages will be illustrated.

In a specific example, a 48V modular battery management system is implemented in accordance with the architecture of the electric vehicle range extending apparatus as shown in FIG. 1. The amount of range extension is evaluated and verified by a 96V three-wheel electric vehicle. As will be shown below, road measurements shows that the approach of providing a power balancing signal in an embodiment of the control method of the electric vehicle range extending apparatus according to the invention achieves significant range extension.

In the specific example, the initial evaluation and verification method is: to test the main battery pack with balance discharging and without balance discharging; and the initial test uses an electronic load for a constant-current discharge test. In this specific example, the main battery pack is a lithium-iron battery pack, which uses lithium iron phosphate battery cells, manufactured by Amita Technologies Inc., each of a single cell having a rated voltage of 3.2V, rated capacity of 30 Ah. The main battery pack is an assembly of 32 battery cells in series (i.e., 96V32 S battery pack), with a rated voltage of 96V and capacity of 30 Ah. In addition, the electronic load is a 120V, 30 A, 6 KW electronic load, manufactured by ITECH ELECTRONICS, through which the battery pack is allowed to operate in an ideal state of the constant-current discharge. In addition, an actual vehicle test will be taken with a 96V electric vehicle as a test platform, in a general road, wherein different test conditions are employed to assess the extended range benefited from the electric vehicle range extending apparatus and its control method in this specific example.

Firstly, the constant-current discharge test is performed with the electronic load, wherein the 96V32 S battery pack is discharged with a discharge rate of 0.5 C. During discharging, a main control system monitors the status of the modular battery management system, and sends data by a communication system to a vehicle information system for data analysis and storage. While the discharging is performed with a constant current of 15 A, if there is a battery cell of the battery pack over-discharges with a voltage of 2.5V, the main control system will cut off the circuitry of discharging and the discharging is thus stopped.

In the specific example, a 24V battery pack of the electric vehicle, which is originally for powering its peripherals, is utilized as the auxiliary battery pack (or called external balancing battery). In addition, according to an embodiment of the electric vehicle range extending apparatus of the invention, a power balancing signal will be applied to any battery cell with the lowest voltage so as to mitigate the situation of over-discharging, thus achieving range extension.

In addition, according to an embodiment of the control method of the electric vehicle range extending apparatus of the invention, when there is a battery cell with its voltage less than a balance starting value (such as 3.0V), and the voltage difference between a battery cell with the highest voltage (or denoted, a first battery cell) and a battery cell with the lowest voltage (or denoted, a second battery cell) is greater than a balance setting value (such as 0.1V), balance charging is started. The electric vehicle range extending apparatus employs a 24V-to-5V step-down voltage provision unit to utilize the electricity from the auxiliary battery pack for the balance charging (or active balance), to increase the voltage of the second battery cell by applying electricity of 5V, 6 A, and 30 W, for instance. When the voltage difference between the second battery cell and other battery cell having a lowest voltage is greater than a balance cut-off value, the balance charging is stopped and a determination as to whether to do balance charging is performed again.

Test 1: as shown in Table 1 below, in the above configuration of this specific example, discharging and range extension experiments are performed by using the electronic load. The preliminary results show that in the experiments using the control method for range extension, the total discharge time and total ampere hour are increased by 0.22 hr and 3.08 Ah respectively, with a range extension effect of 12%, as compared to the experiments without using the control method for range extension.

Table 1: discharging and range extension experiments by using the electronic load.

| Test item | Total discharge time | Total ampere hour |
| --- | --- | --- |
| Without range extension | 1.76 hr | 26.73 Ah |
| With range extension | 1.98 hr | 29.81 Ah |

In the following, an actual vehicle test is performed on a 96V electric vehicle as a test platform, with a lithium-iron battery pack having a rated voltage of 3.2V, rated capacity of 30 Ah for powering peripherals in the electric vehicle as the auxiliary battery pack (or called, external balance battery). The auxiliary battery pack can be charged by an external power source (such as a solar plate), so as to extend the battery life of the 96V32 S main battery pack. When the electric vehicle is in driving state, the 96V32 S main battery pack provides the power for the motors, the 24V auxiliary battery pack provides the power for peripherals of the electric vehicle. When the voltage of a battery cell among the 96V main battery pack is less than 3.0V (i.e., a balance starting value), and the voltage difference between a battery cell with the highest voltage and a battery cell with the lowest voltage among the 96V main battery pack is greater than 0.1V (i.e., a balance setting value), balance charging is started. In this case, the 24V-to-5V step-down voltage provision unit utilizes the electricity of the auxiliary battery pack as an energy source of the active balance, and outputs the electricity of 5V, 6 A, and 30 W for attempting to increase the voltage of the battery cell with the lowest voltage. When the voltage difference between the battery cell being balanced and other battery cell having a lowest voltage is greater than a balance cut-off value, the balance charging is stopped and a determination as to whether to do balance charging is performed again, so that the battery life and usage efficiency of the 96V main battery pack can be extended.

In this specific example, the 96V electric vehicle, as a test platform, has a size of 1.6 M×1.3 M×0.7 M, with the maximum passengers of two, with two front wheels and one rear wheel, and is driven by a rear wheel motor with a rated power of 3 kw, resulting in the highest speed up to 60 km/hr. In addition, the 96V lithium iron phosphate battery pack including two 48V, 30 Ah battery cells in series is disposed under the seat, and the main control system is disposed near the back of the 96V lithium iron phosphate battery pack.

Test 2: road measurements performed in a general road to test range extension results. In addition, optimization of parameters for the control method for range extension is also considered in Test 2; for instance, finding a balance starting value for starting the control method so as to obtain the maximum effect of range extension. The balance starting value is set to 3.0V, 3.02V, 3.04V, 3.06V, 3.08V, 3.1V. In addition, an experiment of not using the control method is also performed, and the results are shown in Table 2. During the running of the electric vehicle, when there is a battery cell with its voltage less than the balance starting value and the voltage difference is up to 0.1V or above, the system will start the control method for range extension, to utilize the auxiliary battery pack to improve the inconsistency of the battery cells' voltages, thus extending the battery life of the main battery pack. Test 2 shows that the control method for range extension according to the invention implemented in the electric vehicle can extend the battery life of the vehicle of about 10%, thus significant enhancing the usage efficiency of the battery pack.

Test 2: results of discharging and range extension experiments using an actual 96V electric vehicle.

| Balance starting value | Total driving distance | Powered by auxiliary battery pack | Extended Range |
| --- | --- | --- | --- |
| Without the control method for range extension | | | |
| N/A | 69.3 km | 0 Wh | 0 km |
| Starting the control method for range extension | | | |
| 3.0 V | 72.5 km | 15.1 Wh | 3.2 km |
| 3.02 V | 73.4 km | 16.2 Wh | 4.1 km |
| 3.04 V | 74.7 km | 16.9 Wh | 5.4 km |
| 3.06 V | 75.6 km | 17.5 Wh | 6.3 km |
| 3.08 V | 76.0 km | 17.7 Wh | 6.7 km |
| 3.10 V | 76.2 km | 17.8 Wh | 6.9 km |

As shown in Table 2, the battery life of the battery pack can be extended effectively by using the control method for range extension according to an embodiment. In addition, when the balance starting value is set to a larger value, i.e., the control method for range extension is started early, then the effects of range extension are greater. As shown in Table 2, the maximum extended range occurs when the balance starting value is set to 3.10V, thus resulting in an extended range of 6.9 km or range extension of 10%, as compared to the experiment without using range extension. In addition, the electricity that is transferred from the auxiliary battery pack transfer is proportional to the magnitude of the extended range. The maximum extended range occurs in the experiment when the balance starting value is 3.10V, and the maximum electricity to be transferred is 17.8 Wh, which is about 2.5% of the electricity of the auxiliary battery pack (24V, 30 Ah, 720 Wh). Thus, it is regarded as an efficient range extension strategy by way of discharging in view of the electricity transferred, corresponding to a range extension of 10%.

While the invention has been described by means of specific embodiments, numerous modifications and variations could be made thereto by those skilled in the art without departing from the scope and spirit of the invention set forth in the claims.

What is claimed is:

1. An electric vehicle range extending apparatus, for use in an electric vehicle with a main battery pack including a plurality of battery cells, the apparatus comprising:
   a step-down voltage provision unit, having: an input port to be coupled to the main battery pack or an auxiliary battery pack, and an output port to output a power balancing signal;
   a cell voltage sensing circuit, for being coupled to the plurality of battery cells and sensing individual voltages of the plurality of battery cells;
   a cell switching circuit, including a plurality of switches, coupled to the plurality of battery cells respectively, and coupled to the output port; and
   a control circuit, coupled to the cell voltage sensing circuit, the step-down voltage provision unit, and the cell switching circuit, for controlling the cell switching circuit based on the individual voltages of the plurality of battery cells so as to apply the power balancing signal to at least one of the plurality of battery cells selectively;
   wherein the control circuit determines, among the plurality of battery cells, a first battery cell with a highest voltage and a second battery cell with a lowest voltage, based on the individual voltages of the plurality of battery cells;
   wherein the control circuit determines whether a voltage difference between the first battery cell and the second battery cell is greater than a balance setting value;
   wherein the control circuit determines whether a voltage of the second battery cell lies between a balance starting value and a voltage setting value if the voltage difference between the first battery cell and the second battery cell is greater than the balance setting value;
   wherein the control circuit controls the cell switching circuit so as to apply the power balancing signal selectively to the second battery cell if the voltage of the second battery cell lies between the balance starting value and the voltage setting value; and wherein control circuit stops to apply the power balancing signal to the second battery cell if the control circuit determines a voltage difference between the second battery cell and a battery cell having a lowest voltage among the plurality of battery cells except the second battery cell is greater than a balance cut-off value.

2. The electric vehicle range extending apparatus as claimed in claim 1, wherein the control circuit is for determining the second battery cell with the lowest voltage among the plurality of battery cells, based on the individual voltages of the plurality of battery cells, and accordingly controlling the cell switching circuit to apply the power balancing signal selectively to the second battery cell with the lowest voltage.

3. The electric vehicle range extending apparatus as claimed in claim 1, wherein the control circuit enables the input port to be coupled to the main battery pack or the auxiliary battery pack selectively based on whether the auxiliary battery pack has sufficient electricity, so that the step-down voltage provision unit outputs the power balancing signal from the output port.

4. The electric vehicle range extending apparatus as claimed in claim 1, wherein the auxiliary battery pack is coupled to a renewable electricity generation system and obtains energy therefrom.

5. The electric vehicle range extending apparatus as claimed in claim 4, wherein the renewable electricity generation system is a solar electricity generation system.

6. The electric vehicle range extending apparatus as claimed in claim 1, wherein the auxiliary battery pack is coupled to a regenerative braking system and obtains energy therefrom.

7. The electric vehicle range extending apparatus as claimed in claim 6, wherein the regenerative braking system is an in-wheel generator of the electric vehicle.

8. An electric vehicle range extending method, comprising:
   a) providing an electric vehicle range extending apparatus in an electric vehicle, wherein the electric vehicle has a main battery pack including a plurality of battery cells, the apparatus comprising a cell voltage sensing circuit, a step-down voltage provision unit, a cell switching circuit, and a control circuit, the step-down voltage provision unit, coupled to the main battery pack or an auxiliary battery pack, is for outputting a power balancing signal;
   b) sensing individual voltages of the plurality of battery cells by using the cell voltage sensing circuit; and
   c) controlling the cell switching circuit, by the control circuit based on the individual voltages of the plurality of battery cells, to apply the power balancing signal to at least one of the plurality of battery cells selectively, comprising:
   determining, among the plurality of battery cells, a first battery cell with a highest voltage and a second battery cell with a lowest voltage, based on the individual voltages of the plurality of battery cells;
   determining whether a voltage difference between the first battery cell and the second battery cell is greater than a balance setting value; determining whether a voltage of the second battery cell lies between a balance starting value and a voltage setting value if the voltage difference between the first battery cell and the second battery cell is greater than the balance setting value; and
   controlling the cell switching circuit to apply the power balancing signal selectively to the second battery cell if the voltage of the second battery cell lies between the balance starting value and the voltage setting value;
   and d) stopping to apply the power balancing signal to the second battery cell if a voltage difference between the second battery cell and a battery cell having a lowest voltage among plurality of battery cells except the second battery cell is greater than a balance cut-off value.

9. The electric vehicle range extending method as claimed in claim 8, further comprises:
   determining, by the control circuit, the second battery cell with the lowest voltage among the plurality of battery cells, based on the individual voltages of the plurality of battery cells, and accordingly controlling the cell switching circuit so as to apply the power balancing signal selectively to the second battery cell with the lowest voltage.

10. The electric vehicle range extending method as claimed in claim 8, further comprising:
    enabling the step-down voltage provision unit to be coupled to the main battery pack or the auxiliary battery pack selectively, by using the control circuit based on whether the auxiliary battery pack has sufficient electricity, so that the step-down voltage provision unit outputs the power balancing signal from the output port.

11. The electric vehicle range extending method as claimed in claim 10, further comprising:
    if the auxiliary battery pack has sufficient electricity, enabling the step-down voltage provision unit to be coupled to the auxiliary battery pack, so that the step-down voltage provision unit outputs the power balancing signal;
    if the auxiliary battery pack has not sufficient electricity, enabling the step-down voltage provision unit to be coupled to the main battery pack, so that the step-down voltage provision unit outputs the power balancing signal.

* * * * *